United States Patent [19]

Hirose et al.

[11] Patent Number: 5,065,438
[45] Date of Patent: Nov. 12, 1991

[54] CHARACTER RECOGNITION APPARATUS WITH INPUTTING FUNCTION OF RULED LINES

[75] Inventors: Hitoshi Hirose, Higashiosaka; Fumio Togawa, Nara, both of Japan

[73] Assignee: Sharp Kabushiki Kaisha, Osaka, Japan

[21] Appl. No.: 425,967

[22] Filed: Oct. 24, 1989

[30] Foreign Application Priority Data

Oct. 27, 1988 [JP] Japan .................. 63-271407

[51] Int. Cl.⁵ .............................. G06K 9/22
[52] U.S. Cl. ......................... 382/13; 340/706; 382/59; 382/61; 395/105
[58] Field of Search .......... 340/706, 707, 710; 178/18; 382/13, 59, 61, 60; 364/518, 521; 358/401, 448, 451, 452, 453, 462

[56] References Cited

U.S. PATENT DOCUMENTS

| Re. 32,633 | 4/1988 | Hovey et al. | 340/710 |
|---|---|---|---|
| 3,089,918 | 5/1963 | Graham | 340/706 |
| 4,142,183 | 2/1979 | Castleberry et al. | 340/706 |
| 4,771,336 | 9/1988 | Ohtorii | 358/452 |
| 4,849,911 | 6/1989 | Campian | 364/521 |
| 4,852,055 | 7/1989 | Lapeyre | 340/710 |

FOREIGN PATENT DOCUMENTS 55-48614 12/1980 Japan .

OTHER PUBLICATIONS

Apple Computer, Inc. *Lisa Draw Manual*, Reorder #A6L0342 1984, pp. 74–75, 84–89, 128–129, 166–167.

*Primary Examiner*—Leo H. Boudreau
*Assistant Examiner*—Barry Stellrecht

[57] ABSTRACT

A character recognition apparatus includes an inputting function of ruled lines. The apparatus is equipped with a tablet type input device integrating a tablet type input device with a display panel. The apparatus includes a control unit that recognizes information inputted in an input panel by a stylus pen. There is a memory unit for storing the recognized information. The control unit sets a grating-like virtual frame in the input panel. The frame set in the input panel is a virtual boarder obtained by calculation and does not appear on a display panel.

14 Claims, 9 Drawing Sheets

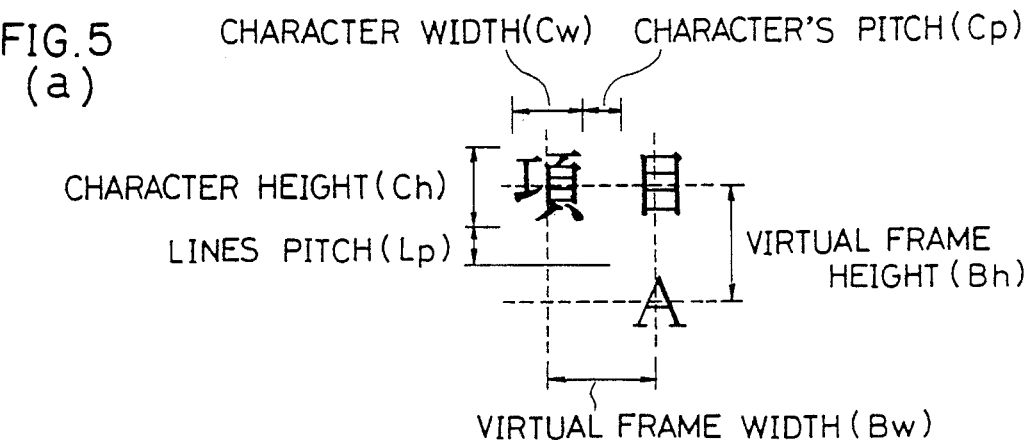
(a) THE CASE THAT $Bh = Ch + Lp$, $Bw = Cw + Cp$
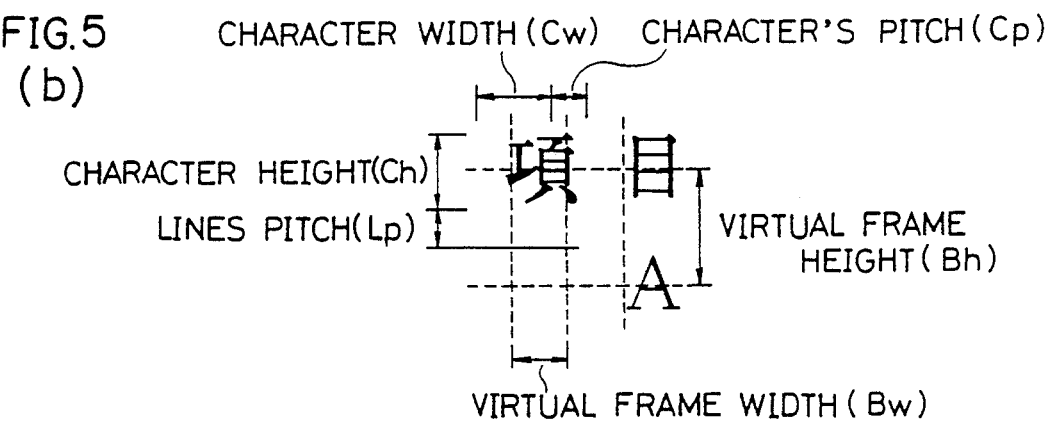
(b) THE CASE THAT $Bh = Ch + Lp$, $Bw = (Cw + Cp)/2$

CHARACTER RECOGNITION APPARATUS WITH INPUTTING FUNCTION OF RULED LINES

BACKGROUND OF THE INVENTION (1) Field of the Invention

The invention relates to a character recognition apparatus, and more particularly to a character recognition apparatus which includes an integrated combination of a flat tablet type input panel with a flat display panel. The apparatus detects and recognizes information inputted by a stylus pen.

(2) Description of the Prior Art

Conventionally, when this type of character recognition apparatus, i.e., a display-integrated tablet type input device using liquid crystal or EL display as a display panel is used to input ruled lines, such a method for displaying ruled lines has been generally used that specific coordinates given by each movement of a stylus pen over an input panel are unified so as approximate line segments in the same direction in order to display ruled lines.

Such apparatus performing the line interpolation is known as "line interpolation apparatus" shown in Japanese Patent Publication No. 48614/1980 wherein linear interpolation is made continuously, linearly, in an interpolation area at a defined graduation on the basis of an initial value at a starting point of the interpolation area, a termination value at a terminus point, and an interval data between the starting and terminus points.

The conventional method of ruled lines input by the above-mentioned character recognition apparatus has problems. One problem is that an internal process for constructing the ruled lines is very complicated. Another problem is a poor operational feeling. This is caused because ruled lines are inputted which actually correspond to the position of the cursor indicating input position for character, so that ruled lines display follows a movement of stylus pen awkwardly.

SUMMARY OF THE INVENTION

The invention is a character recognition apparatus with a function to input ruled lines which sets a grating-like virtual frame in an input panel to enable corresponding to movement of a stylus pen drawing of ruled lines in a frame unit defined by the grating. The invention provides a character recognition apparatus which comprises an integrated combination of a tablet type input device having an input panel with a display panel and detects and recognizes information inputted by a stylus pen. There are provided a virtual frame setting means for setting a number of virtual frames including grating-like sections within the input panel, there are detection means for detecting a positional information of the stylus pen indicated on the input panel, and convertion means for converting the stylus pen's positional information detected by the detection means into a positional information of the virtual frame memory means store the positional information of the virtual frame, comparison means compare through the positional information of the virtual frames the stylus pen's positions provided before and after movement thereof on the input panel. Also provided are and ruled lines input means for inputting a ruled line with a unit length of one frame width between at least two or more virtual frames when the stylus pen is moved therebetween.

The frame set in the input panel is a virtual boarder obtained by calculation, which does not appear on an actual display panel.

According to the present invention, when a location in the input panel is indicated by the stylus pen the detecting means reads the indicated positional information converting means converts the indicated positional information into the positional information for a virtual frame. This causes the memory means to store that positional information. Then, the stylus pen is moved over the input panel to produce further positional information for the virtual frame in relation to the new location of the stylus pen. The comparing means compares the positional informations of virtual frames provided before and after the movement of the stylus pen, so that when the stylus pen is moved between at least two or more virtaul frames, the ruled line input means inputs a ruled line having a unit length of one frame width between the virtual frames provided before and after the movement of the stylus pen.

According to the present invention, of movement of hands occurs when a ruled line is input manually by use of the stylus pen, will be absorbed since a ruled line to be refined in a ruled line process will be an accurate straight line drawn at each frame with a unit length of frame width. This enable an easily input a ruled line with a simple operation.

Also, since the virtual frame for preparation of ruled lines is set to be displaced from an original point for indication of characters, a further efficiency of ruled lines to the stylus pen can be facilitated even when a unit length of ruled line is relatively long.

BRIEF DESCRIPTION OF THE DRAWINGS

An embodiment of the invention will now be described by way of example and with reference to the accompanying drawings, in which.

DESCRIPTION OF THE PREFERRED EMBODIMENTS

Figure 1:
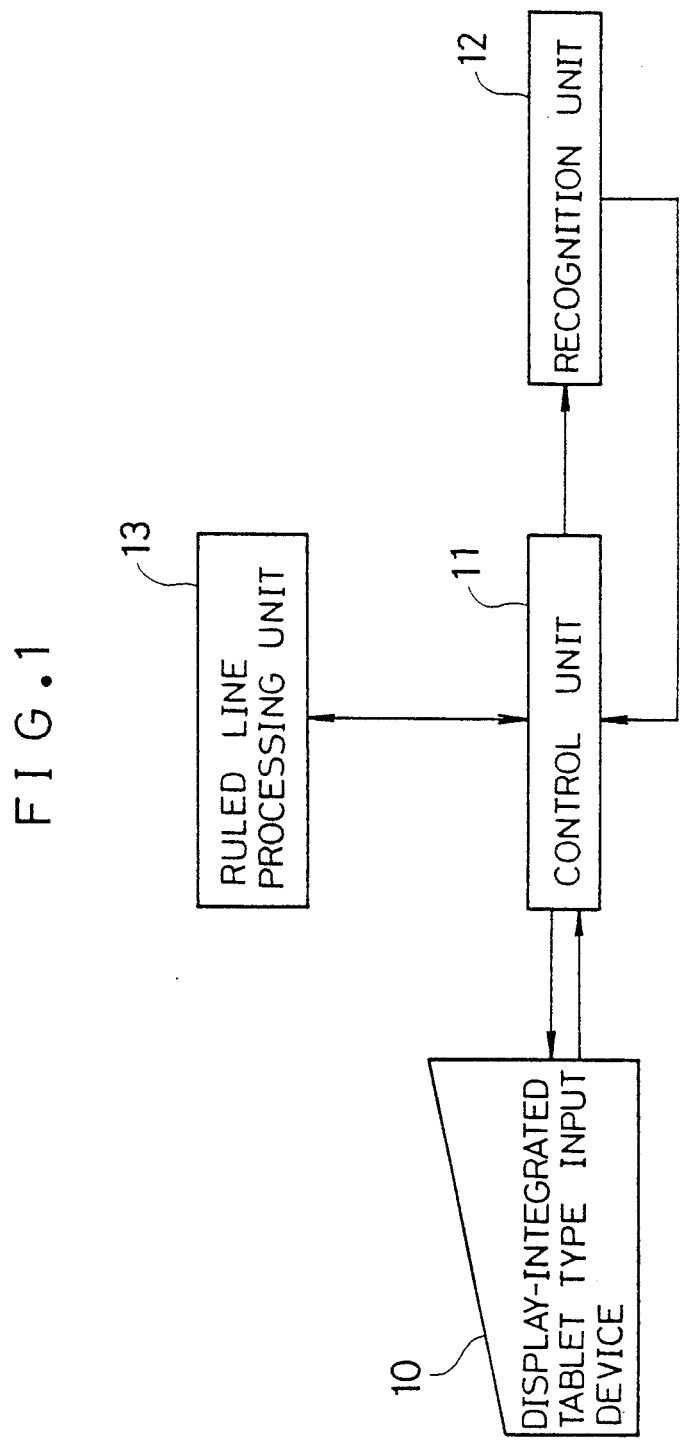
FIG. 1 is a block diagram showing a preferred embodiment of the present invention.

In FIG. 1, 10 denotes a display-integrated tablet type input device comprising integrally a flat display panel such as LCD or EL display and a tablet type input unit having a flat input panel. Given information including hand-written characters or various indications inputted through the display-integrated tablet type input device 10 is applied to a control unit 11. The control unit 11 transmits the input information to a recognition unit 12 which returns to the control unit 11 a recognizing result corresponding to the input information. On the basis of the recognizing result, the control unit 11 commands a ruled line processing unit 13 to execute a ruled line process, the characteristic of this embodiment, corresponding to the recognizing result.

Figure 2:
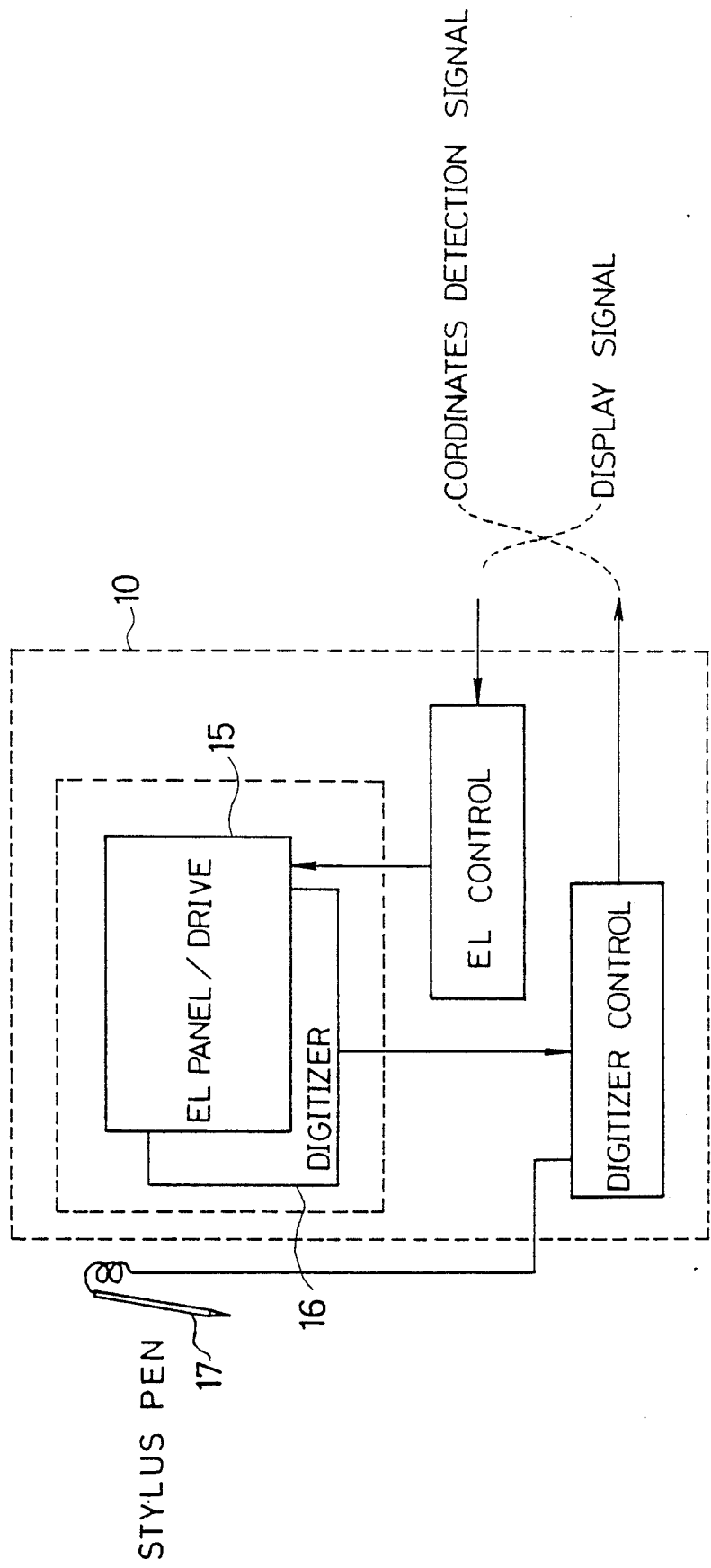
FIG. 2 is a block diagram showing a construction of a display-integrated tablet type input device in FIG. 1.

FIG. 2 shows a construction of the display-integrated tablet type input device, wherein a display panel 15 comprises a laminated construction, for example, sandwiching an EL layer at both of its upper and lower surfaces with glass plates. Also, an input panel is constructed with an electromagnetic induction type digitizer 16.

Figure 3:
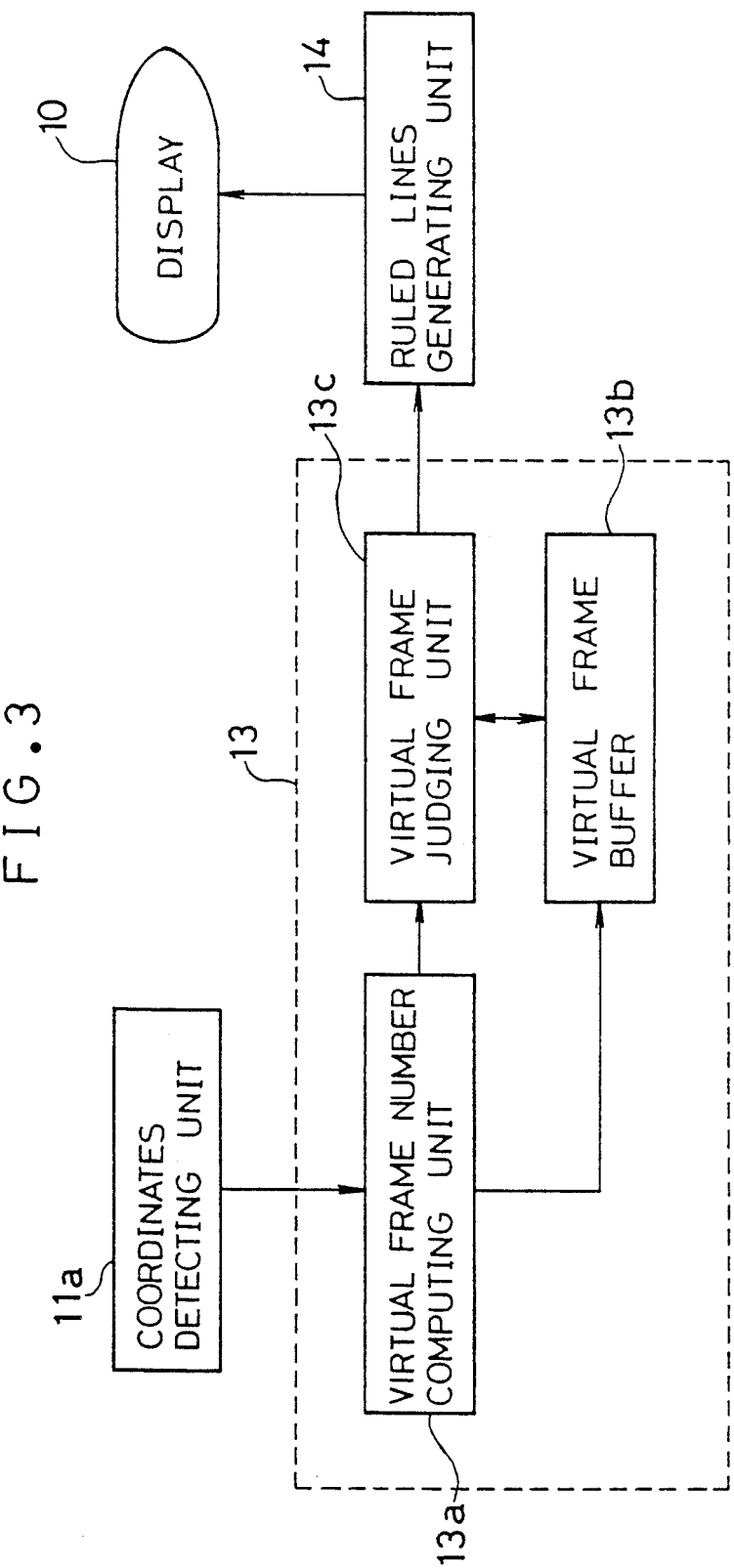
FIG. 3 is a block diagram showing a ruled line processing unit in FIG. 1.

The ruled lines processing unit 13, as shown in FIG. 3, has a virtual frame number computing unit 13a serving a virtual frame setting means and a converting means, a virtual frame buffer 13b serving a memory means, and a virtual frame judging unit 13c serving a comparing means.

An input panel is virtually sectioned as a grating to set within the input panel a number of frames (called hereunder a virtual frame) corresponding to specific arrangements of characters. The virtual frame number computing unit 13a caluculates a transverse frame number and a vertical frame number, i.e., a positional information of a virtual frame on the basis of coordinates of stylus pen 17, in turn, its positional information on the input panel which positional information has been inputted in the virtual frame and detected by a coordinates detecting unit 11a.

The virtual frame buffer 13b memorizes a virtual frame number (vertical and transverse ones) outputted from the virtual frame number computing unit 13a. And the virtual frame judging unit 13c compares through virtual frame numbers the stylus pen's positions provided before and after moving of the stylus pen on the input panel. Ruled lines generating unit 14 comprises a display control unit and inputs a ruled line with a unit length of one frame width between virtual frames (from a starting frame to a terminus frame) when the stylus pen is moved between at least two or more virtual frames.

The control unit 11 and ruled line processing unit 13 are constructed with a micro processor and performs a ruled line process (described later) in accordance with a control program stored in a memory (not shown).

Figure 4:
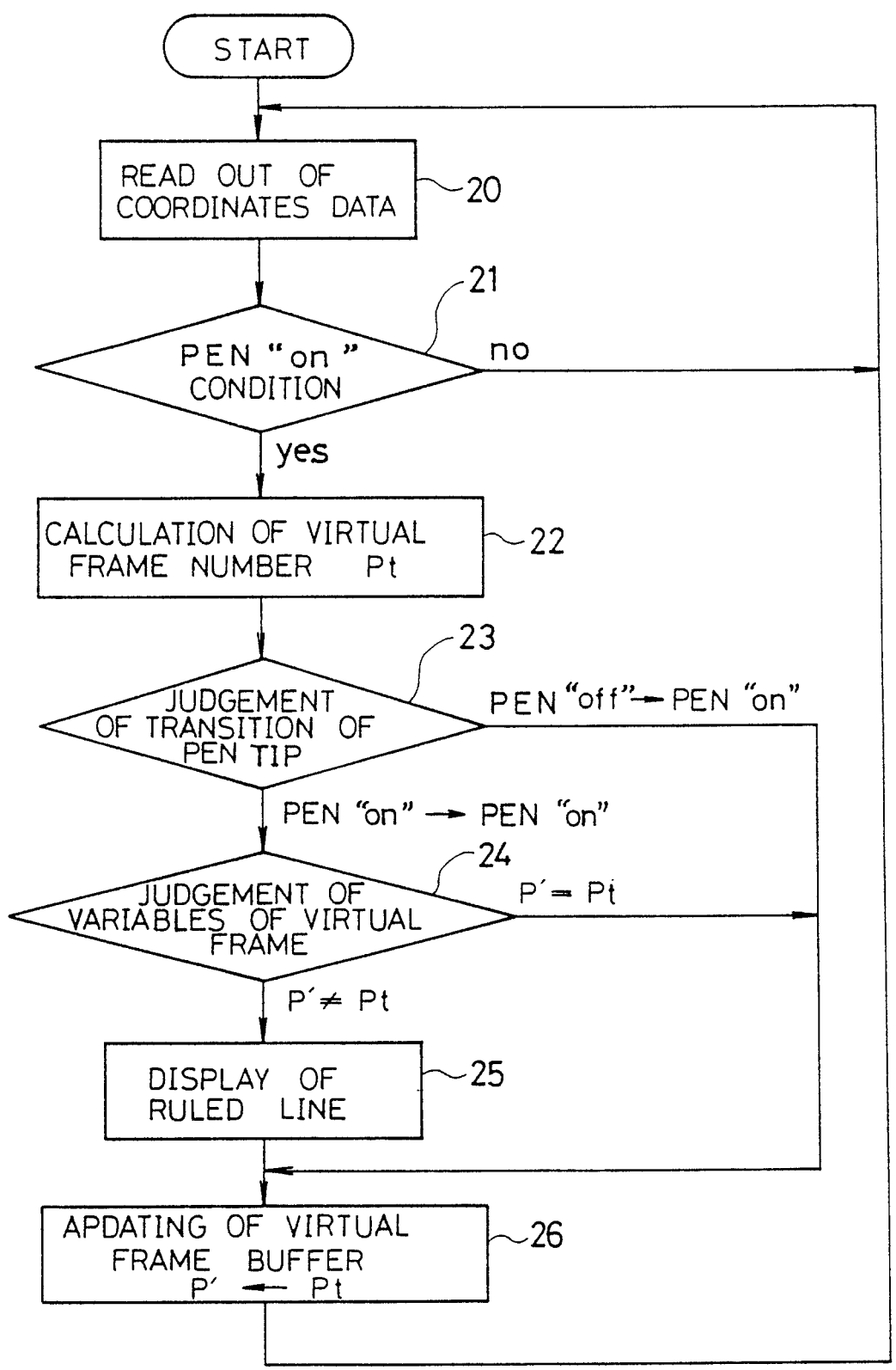
FIG. 4 is a flow chart clarifying operation of the preferred embodiment of the present invention, FIGS. 5 (a) and 5 (b) are explanatory views showing a relationship between virtual frames and characters in the embodiment, FIGS. 6 (a), 6 (b), 6 (c) and 6 (d) are explanatory views showing operation of input in the preferred embodiment of the present invention, and FIGS. 7 (a), 7 (b), 7 (c) and 7 (d) are explanatory views showing operation of input in an alternative preferred embodiment of the present invention.

Next, the ruled line process will be detailed in accordance with the flow chart shown in FIG. 4.

First, when the stylus pen is present in a coordinates detectable area at the display-integrated tablet type input device 10, conditions of the pen tip to an input panel (called hereunder "Pen On" when it contacts with an input panel, and "Pen Off" when it is away from the input panel) and data of coordinates are transmitted to the coordinates detecting unit 11a at the control unit 11 to read out the coordinates data (Step 20). The coordinates detecting unit 11a judges relevancy or irrelevancy of data over the transmitted conditions on the pen tip (Step 21), and processes on the basis of the judgement result under the following conditions.

(a) When relevant data (taken from "Pen On" condition) is confirmed, a coodinate data is transmitted to the virtual frame number computation 13a at the ruledline processing unit 13 to be processed thereat.

(b) When irrelevant data (taken from "Pen Off" condition) is confirmed, a new data reading out process shall be performed.

Upon having relevant data, the virtual frame number computing unit 13a calculates an existing pen position Pt (called hereunder a virtual frame number) over a transmitted coordinate data (Step 22), judges a transition of pen tip condition from time t1 to t (Step 23), and processed under the following conditions. In this case, a vertical length B and a transverse length Bw of the virtual frame are equal to a vertical unit length 1y and a transverse unit length 1x of the ruled line. And, ruled lines are generally input between characters or lines, so that a virtual frame is set, as shown in FIG. 5, in manner that an intersecting point of vertical and transverse lines of the virtual frame shall be positioned at the center of the character. In FIG. 5 (a), a transverse unit length 1x of the ruled line is represented as 1x=Cw+Cp, and shows a dimension and a position of the virtual frame with respect to an em character. Also, in FIG. 5 (b), a transverse unit length 1x of ruled line is represented as 1x=(Cw+Cp)/2 and shows a dimension and a position of the virtual frame with respect to an en character.

The virtual frame number Pt calculated at the virtual frame number computing unit 13a is represented by a transverse number Kt and a vertical number Lt, and the Kt and Lt can be obtained by the following formulas (1) and (2).

$$Kt = int(Xt/Bw) + 1 \tag{1}$$

$$Lt = int(Yt/Bh) + 1 \tag{2}$$

The first sections of right side in the formulas (1) (2) each signifies that a calculation result inside the parentheses has integer. Also, Xt, Yt show coordinates of the stylus pen. Next, when a transition of pen tip condition is (c) Pen Off→Pen On, a virtual number Pt is stored in the virtual frame buffer 13b, and a new data reading out process shall be performed. And, when the transition of pen tip condition is (d) Pen On→Pen On, an obtained virtual frame number Pt is to be transmitted to the virtual frame judging unit 13c, which then compares the received virtual frame number Pt from the virtual number computation 13a with a proceding virtual frame number P′ stored in the virtual frame buffer 13b (Step 24) to make processing under the following conditions.

(e) When P′≠Pt, the virtual frame judging unit 13c regards that there is occurence of movement of the stylus pen, and sends a signal to the ruled line generating unit 14 so as to display a ruled line of a unit length (Step 25). Simultaneously, a virtual frame number Pt is stored in the virtual frame buffer 13b to update the virtual frame number (Step 26), and a next data reading out process shall be proceeded.

(f) When P′=Pt, the virtual frame judging unit 13c regards that there is no movement of the stylus pen, and displays no line. A next data reading out process shall be proceeded. (Step 20).

Input of ruled lines is performed by repeating the above-mentioned process.

Figure 6:
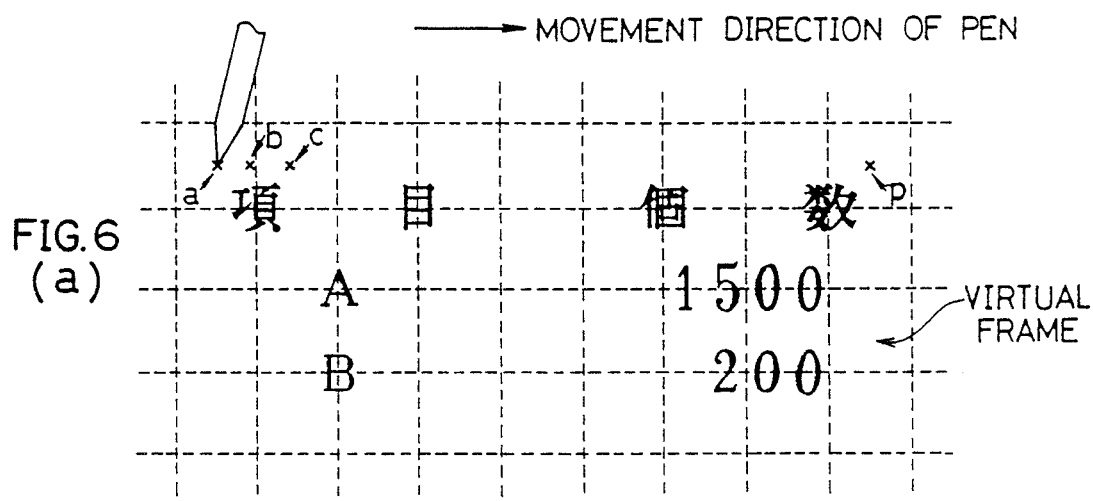
Figure 6:
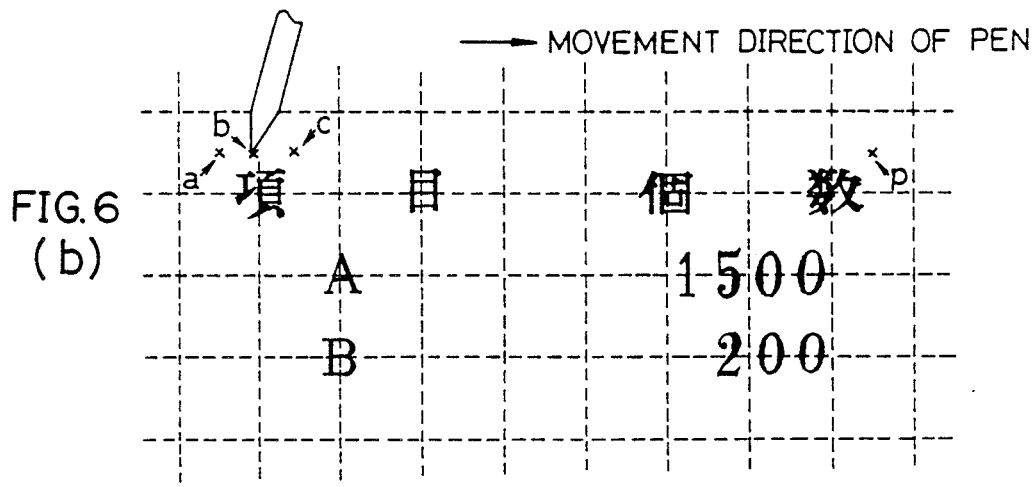
Figure 6:
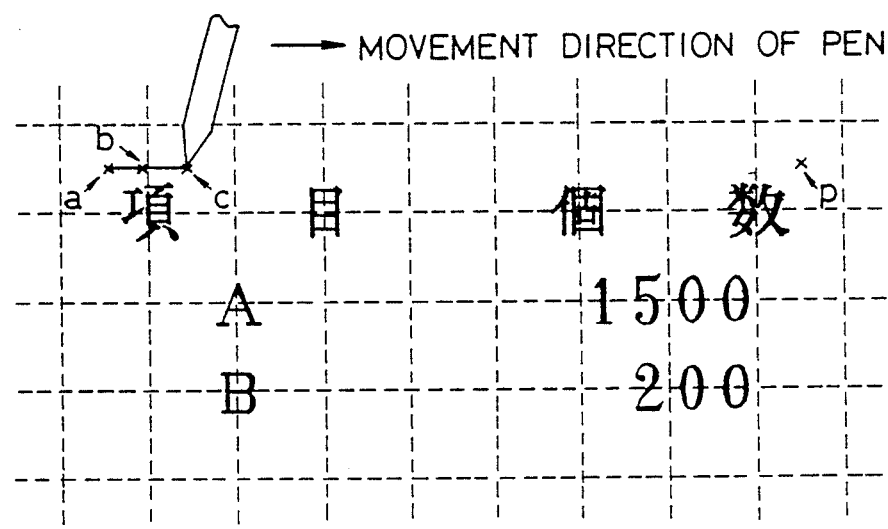
Figure 6:
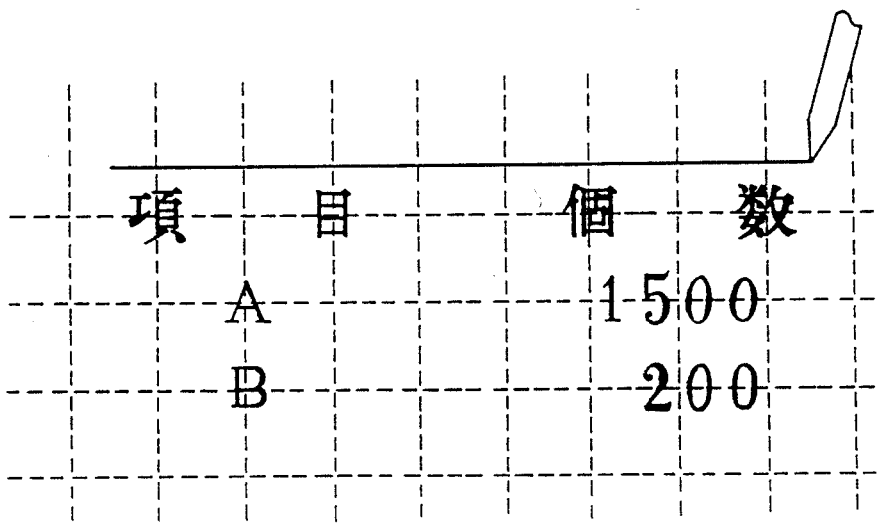
Figure 7:
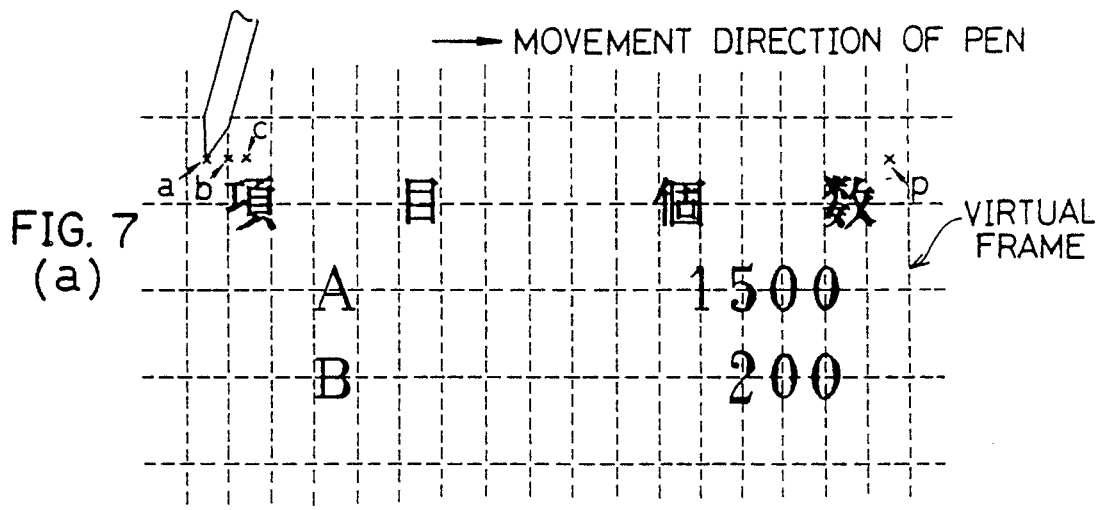
Figure 7:
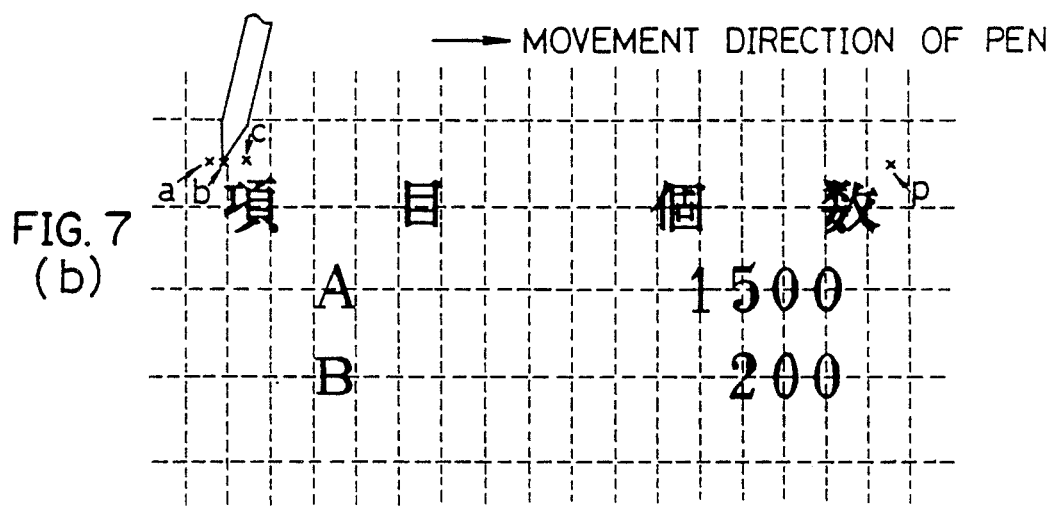
Figure 7:
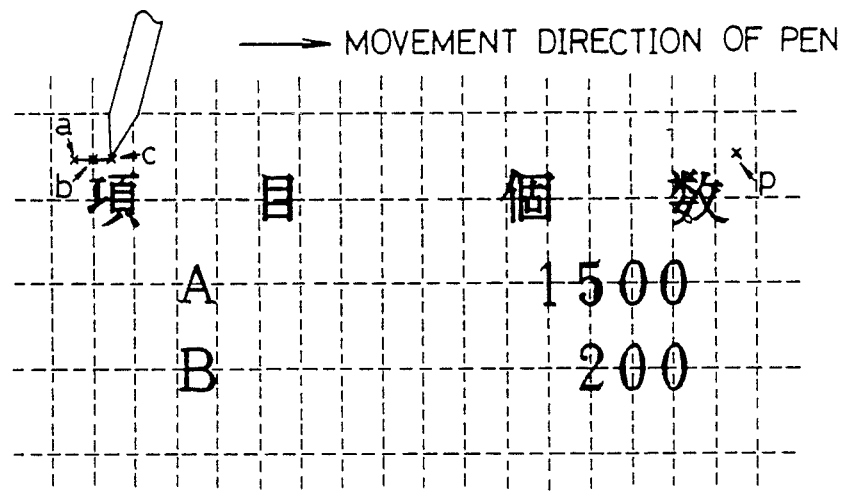
Figure 7:
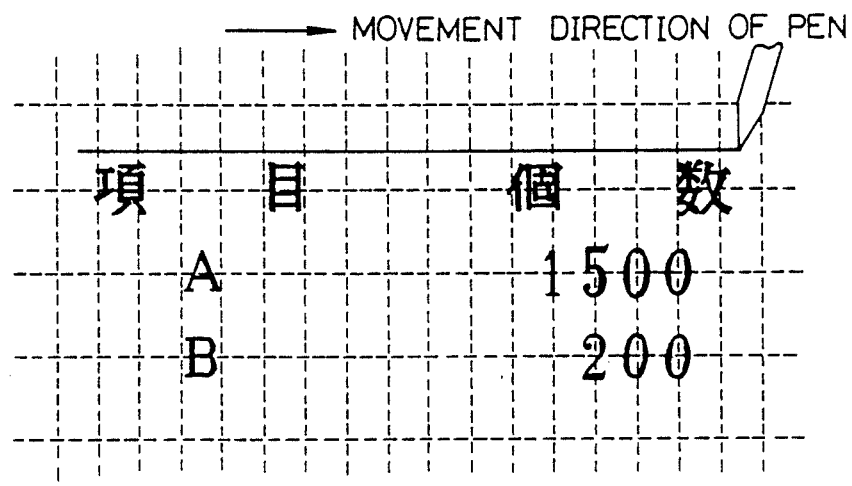

Next, an actual example of ruled line input will be detailed using FIGS. 6 and 7.

In this case, the ruled lines will be input basically between characters and between the lines. In FIG. 6, when the vertical unit length 1x of ruled line is set to be em, and the vertical unit length 1y to a width of one line, 1x=Cw+Cp, 1y=Ch+Lp (See FIG. 5). Also, in FIG. 7 as a second example, when 1x is set to be en and 1y to be a width of one line, 1x=(Cw+Cp)/2, 1y=Ch+Lp (See FIG. 5). Further, the dotted lines in FIGS. 6 and 7 define a virtual frame.

In FIG. 6, the virtual frame and the characters have such relationship that an intersecting point of the vertical and transverse lines are positioned at the center (original point of coordinates) of the characters since a transverse unit length of ruled lines is em. Also, in FIG. 7, the virtual frame and the characters have such relationship that an intersecting point of the vertical and horizontal lines are displaced in position from the center of the characters at an interval of ½ en in comparison with the feature of FIG. 6 since a transverse unit length of ruled lines is en.

In FIG. 6, assuming that a coordinate (x, y) at the point a corresponding to the position of stylus pen is (133, 255), and a unit length of ruled line is that $1x=24$ and $1y=24$. When the stysus pen is moved from the position for inputting a ruled line, a virtual frame number of point a at the original position of stylus pen is $K_1=6$, $L_1=11$ by the formulas (1) and (2), and simultaneously, $K'=6$, $L'=11$, those to be stored in the virtual frame buffer 13b.

Then, when the stylus pen is further moved, a coordinate will be read at the point b (See FIG. 6 (b)). Assuming that this value is (140, 255), the formulas (1) and (2) provide that the virtual frame number $K_2=6$, and $L_2=11$. The values of $K_2$, $L_2$ when compared with the virtual frame number previously stored in the virtual frame buffer are equal thereto ($K'=K_2$, and $L'=L_2$), so that ruled lines are not displayed.

When the stylus pen is furthermore moved and a coordinate (165, 255) is read at the point C, a virtual frame number that $K_3=7$ and $L_3=11$ is obtained. The virtual frame number when compared with a previously stored one in the virtual frame buffer represents $K'\neq K_3$, so that a ruled line will be displayed as shown in FIG. 6(c), and the content of the virtual frame buffer 13b is updated to be $K_3$ and $L_3$ simultaneously. Thereafter, input of ruled lines will be performed by the same process as those to a point P every time that a coordinate is read (See FIG. 6(d)). Furthermore, in FIGS. 7(a) through (d), when the input pencil is moved from point a to p for inputting a ruled line, in case that coordinates at the point a is detected to be (133, 255), (143, 256) at the point b, and (153, 256) at the point c, a virtual frame number (calculated in the same manner as FIG. 6 to be $K_1=6$ and $L_1=11$ at the point a, those being a start point for the ruled line to thereby have $K'=6$ and $L'=11$. Also, $K_2=6$ and $L_2=11$ at the point b, and $K_3=7$ and $L_3=11$ at the point c) and a content of the virtual frame buffer 13b are compared with each other, and a ruled line will be drawn corresponding to a result of the comparison.

Although only one embodiment of the invention has been disclosed and described, it is apparent that other embodiments and modification of the invention are possible in such manner that a character input system through Chines characters may be changed over to that through any other foreign characters.

What is claimed is:

1. A character recognition apparatus for inputting ruled lines which comprises:
   an integrated tablet input device including an input panel and a display panel, the input panel detecting and recognizing information inputted by a stylus pen;
   virtual frame setting means for setting a number of virtual frames including grating-like sections within the input panel;
   detection means for detecting positional information of the stylus pen indicated on the input panel;
   conversion means for converting the positional information of the stylus pen detected by the detection means into a positional information of the virtual frame;
   memory means for storing the positional information of the virtual frame;
   comparison means for comparing through the positional information of the virtual frames the positions of the stylus pen provided before and after movement thereof on the input panel; and
   ruled line input means for inputting a ruled line with a unit length of one frame width and the ruled line being located in at least two virtual frames when the stylus pen is moved therebetween.

2. A character recognition apparatus of claim 1, wherein the display panel is a flat display panel selected from the group consisting of an LCD, an EL display or a plasma display.

3. A character recognition apparatus of claim 1, wherein the virtual frame is so adapted that an intersection point of vertical and transverse lines of the virtual frame is set to be in an area to receive written input so as to be displaced from a character edge at half a character width.

4. A character recognition apparatus of claim 1, wherein the virtual frame is so adapted that an intersecting point of vertical and transverse lines of the virtual frame is set to be in an area to receive written input so as to be displaced at half a character width in transverse position from the center of characters displayed in the display panel.

5. A character recognition apparatus of claim 1, wherein the positional information of the stylus pen represents values of coordinates in traverse and vertical directions.

6. A character recognition apparatus of claim 1, wherein the positional information of the virtual frames is vertical and transverse numbers obtainable by dividing vertical and transverse coordinates of the stylus pen by vertical and transverse unit lengths of ruled lines.

7. A recognition apparatus which can accurately input lines inputted by an input device comprising:
   an input-display tablet for receiving an input;
   control means operatively connected to the input-display tablet for receiving information from the input-display tablet and outputting information to the input-display tablet, and outputting commands; for
   a recognition unit operatively connected to the control means for receiving information from the control means and processing the information to produce a recognized result corresponding to input information and outputting the processed information to the control means; and
   a ruled line unit that includes a virtual frame unit for receiving commands from the control means for performing a ruled line process to produce a ruled line having a length related to a virtual frame.

8. The apparatus of claim 7 wherein the ruled line unit includes a virtual frame number computing unit;
   a virtual frame buffer for providing memory; and
   a virtual frame judging unit for comparing.

9. The apparatus of claim 8 wherein the virtual frame number computing unit functions as a virtual frame setting device and a converting device.

10. The apparatus of claim 9 wherein the input-display tablet is formed as a laminated structure.

11. The apparatus of claim 10 wherein the laminated structure includes an El device sandwiched between glass plates.

12. The apparatus of claim 9 wherein the input device is a stylus pen.

13. The apparatus of claim 9 wherein the ruled line has a unit length of one frame width and is located in at least two virtual frames.

14. The method of producing ruled lines in a character recognition apparatus with the use of a stylus pen comprising the steps of:

(a) inputting rule line information with the stylus pen to an input-display panel;

(b) setting in the input-display a plurality of virtual frames which include grating sections;

(c) detecting the position of the stylus pen on the input-display panel;

(d) converting the position of the stylus pen into positional information on the virtual frames.

(e) storing the information produced in step (d);

(f) comparing the positional information of the stylus pen on the virtual frames before and after movement of the stylus pen; and (g) producing a ruled line with a unit length of one frame width and is located in at least two virtual frames when the stylus pen is moved between the at least two virtual frames.

* * * * *